United States Patent [19]
Hogan

[11] Patent Number: 5,692,132
[45] Date of Patent: Nov. 25, 1997

[54] SYSTEM AND METHOD FOR CONDUCTING CASHLESS TRANSACTIONS ON A COMPUTER NETWORK

[75] Inventor: Edward J. Hogan, Bayside, N.Y.

[73] Assignee: MasterCard International, Inc., New York, N.Y.

[21] Appl. No.: 477,438

[22] Filed: Jun. 7, 1995

[51] Int. Cl.[6] .................................................. G06F 17/60
[52] U.S. Cl. ........................................ 395/227; 395/240
[58] Field of Search ............................ 364/401 R, 408; 395/226, 227, 239, 240

[56] References Cited

U.S. PATENT DOCUMENTS

| | | | |
|---|---|---|---|
| 4,283,599 | 8/1981 | Atalla | 178/22.1 |
| 4,302,810 | 11/1981 | Bouricius et al. | 364/200 |
| 4,315,101 | 2/1982 | Atalla | 178/22.08 |
| 4,423,287 | 12/1983 | Zeidler | 178/22.08 |
| 4,498,000 | 2/1985 | Decavele et al. | 235/380 |
| 4,567,359 | 1/1986 | Lockwood | 235/381 |
| 4,578,530 | 3/1986 | Zeidler | 178/22.09 |
| 4,605,820 | 8/1986 | Campbell, Jr. | 178/22.09 |
| 4,799,156 | 1/1989 | Shavit et al. | 364/401 |
| 4,823,264 | 4/1989 | Deming | 364/408 |
| 4,984,155 | 1/1991 | Geier et al. | 364/401 |
| 4,992,940 | 2/1991 | Dworkin | 364/401 |
| 5,053,956 | 10/1991 | Donald et al. | 364/401 |
| 5,117,355 | 5/1992 | McCarthy | 364/405 |
| 5,220,501 | 6/1993 | Lawlor et al. | |
| 5,285,383 | 2/1994 | Lindsey et al. | 364/408 |
| 5,305,195 | 4/1994 | Murphy | 364/401 |
| 5,319,542 | 6/1994 | King, Jr. et al. | 364/401 |
| 5,420,405 | 5/1995 | Chasek . | |
| 5,426,281 | 6/1995 | Abecassis | 235/379 |
| 5,465,206 | 11/1995 | Hilt et al. . | |
| 5,479,510 | 12/1995 | Olsen et al. | 235/379 |

FOREIGN PATENT DOCUMENTS

| | | |
|---|---|---|
| 0416916 | 3/1991 | European Pat. Off. . |
| 0542298 | 5/1993 | European Pat. Off. . |
| WO 9116691 | 10/1989 | WIPO . |
| WO 9308545 | 4/1993 | WIPO . |
| 9608783 | 3/1996 | WIPO . |

OTHER PUBLICATIONS

"Dutch Software Concern Experiments with Electronic 'Cash' in Cyberspace," by Kim A. Strassel, Wall Street Journal, Apr. 17, 1995.

"Cash Just Isn't Flexible Enough," by Nick Rosen, Daily Express, Feb. 10, 1995.

"Debit Cards Seen Poised For New Market," by Beth Piskora, American Banker, Mar. 7, 1995, at 16.

"Cash, check, charge—What's next?," by David Bank, Seattle Times, Mar. 6, 1995.

(List continued on next page.)

*Primary Examiner*—Donald E. McElheny, Jr.
*Attorney, Agent, or Firm*—Brumbaugh, Graves, Donohue & Raymond

[57] ABSTRACT

In a commercial transaction system, a system user uses a personal computer to interact with merchant computers over the Internet to conduct cashless transactions. Each system user computer processes data including a balance stored in the computer's memory and updates the stored data at the end of the transaction. The system is specially designed for purchases of items or transactions of relatively small monetary value. In this manner, the amount of the transaction is deducted from the balance on the computer. In accordance with the invention, when the existing balance associated with the computer does not cover the price of the transaction, the system provides a reload feature which gives the user an option to increase the balance of the computer. Such a feature allows the purchase to be made without inconveniencing the user to increase the balance by other means. Each time the balance is increased by a reload, the user's issuer bank bills the user for the reload amount.

71 Claims, 7 Drawing Sheets

OTHER PUBLICATIONS

"CyberSpace—crafting software that will let you build a business out there," by Amy Cortese et al., Business Week, Feb. 27, 1995, at 78–86.

"Cards on the Internet—Advertising on a $3 Bill," by Gerry Vadenengel, World Card Technology, Feb. 1995, at 46–48.

"NetBill: An Internet Commerce System Optimized For Network Delivered Services," by Marvin Sirbe et al., Carnegie Mellon Univ., Feb. 27, 1995.

"Cash Card Creator Looking Beyond Mondex", by Jeffrey Kutler, American Banker, Feb. 9, 1995, at 16.

"E–Cash: Can't Live With It, Can't Live Without It," by David Port, The American Lawyer, Mar. 1995, at 116–17.

SYSTEM AND METHOD FOR CONDUCTING CASHLESS TRANSACTIONS ON A COMPUTER NETWORK

TECHNICAL FIELD

The present invention relates to a commercial network transaction system and method and particularly to a system and method for conducting commercial transactions of small monetary value on a computer network without using cash.

BACKGROUND OF THE INVENTION

Many attempts have been made to develop a system whereby the need to carry cash on one's person to make purchases would be obviated. Two common answers have been the use of credit cards and debit cards. In both cases, the card user can make the purchases without cash, one through the extension of bank credit and the other through an immediate electronic debit of a bank account. However, both techniques fail to address the need for cashless solutions to small transactions since the processing costs using either technique are too high with regard to the small transactions.

Another technique for conducting cashless transactions is disclosed in PCT International Publication No. WO 91/16691 published Oct. 13, 1991 and PCT International Publication No. WO 93/08545 published Apr. 29, 1993. The disclosed value transfer system in both publications comprises a computer, a value meter and a bulk purse within a bank, and exchange devices and electronic purses (e.g., integrated circuit cards or smart cards) outside the bank. In accordance with the disclosure, the bulk purse is capable of having cash values loaded to and redeemed by electronic purses via a value meter. The electronic purses communicate with each other through an exchange device to transfer values in transactions which are off-line from the computer. The value meter keeps float value records for the computer to derive a net value released to the bulk purse. Each float value record is nonspecific with regard to individual drawdowns and redemptions.

This prior-art technique has an obvious disadvantage in that the holder of an electronic purse must connect to a bank via a computer to increase his/her monetary level stored in the electronic purse. Therefore, if a user purchases an item at a merchant's site without sufficient funds in the purse, he/she could not immediately purchase the item before accessing a computer to further "charge" the purse. Furthermore, the electronic purse is represented in the disclosure as a smart card designed for carrying to merchant terminals for insertion.

Over the last several years, businesses have been attracted to the rapidly growing number of personal computer users. More specifically, these businesses have realized the potential customer base of the so-called "on-line users." On-line service providers such as America Online, CompuServe, and Prodigy have provided easy access to computer networks such that a large captive audience of on-line consumers has emerged.

These on-line service providers have begun to allow users to use their services as gateways to the expansive international network of networks known as the Internet. The Internet, a series of some 50,000 computer networks around the world, has recently gained substantial popularity due to its promise of providing connectivity between so many computer users with functionality such as electronic mail, file transfer, and remote login. The customer base of Internet users, now more than 38 million, will apparently grow to 100 million by 1998 as more businesses discover the marketing opportunities available on the "net."0 These businesses are especially attracted to the functionality and features of a fairly new Internet service known as the World Wide Web.

The World Wide Web, or Web, provides easier access to Internet information and services. It utilizes the technology called "hypertext" to organize, search and present information on the Internet. A user can select a word ("hypertext word") from a viewed document, and be linked to another document featuring information related to the word. These links are within the Web server domain and result in a progressively deeper search or base of choices. To access the rich environment of hypertext links, graphics, fonts, sound and video, an internet user utilizes a client or Web "browser," such as Mosaic. This browser handles the function of locating and targeting information on the Internet and displaying information provided by a Web server.

In the business arena, a merchant can, with an Internet address and a hypertext editor, develop a first hypertext document called a "home page" (or "virtual storefront") which a user sees when he enters the Web at the merchant's Web server. That home page may provide descriptions of products and services through the use of media such as graphic images, sound, and hypertext link choices. The information allows the consumer to find the product or service he desires to purchase. The result is an easily accessible system for purchasing anything from a journal page and investor advice to travel tickets and golf clubs.

While the business advantages of computer network marketing are clear, the transaction costs may present a problem, especially when the size of the transaction is small, such as the journal page sale.

Several techniques for creating cashless commercial transactions exist for sales over networks such as the Internet. The most common technique involves the use of credit cards where credit is extended to a cardholder by a financial institution to cover purchases from participating merchants. The financial institution pays the merchant the purchase price less a service charge fee and later bills the cardholder for the purchase price.

Such credit card transactions, however, require calling a processing center to obtain authorization for the transactions. This incurs transaction costs as described above, which while acceptable for large purchases, are not cost effective for relatively small purchases (e.g., a journal page). Furthermore, it is not practical for financial institutions to engage in discrete posting of these small transactions.

Another system that allows for purchases without the use of cash is a debit system such as NetBill. In this system, a large server maintains accounts for both merchants and consumers. These NetBill accounts are linked with conventional financial institutions. When a consumer chooses to purchase goods or services from a merchant, a NetBill transaction is commenced in which the product or service is transferred, if possible, e.g., a journal page, the consumer's account is debited, and the merchant's account is credited. When necessary, funds in the consumer's NetBill account can be replenished by electronic transfer from a bank or by credit card. Also, funds in the merchant's NetBill account are made available by depositing the funds in the merchant's bank account.

Disadvantages associated with a debit system such as NetBill stem from the fact that the NetBill server comprises a central computer which must handle every transaction. Because of this requirement, the server's critical CPU time is depleted. Thus, when there is high sales volume, delays in transactions are common and caused by the busy central computer and possibly long-haul transmission of transaction data to the computer. In addition, the merchant must pay for the long-haul transmission to the central computer for each transaction. Finally, because a consumer's account funds reside in the central database of the computer, any breakdown of the central computer, communication or otherwise, would eliminate the ability of the consumer to complete transactions.

Accordingly, it is desirable to have a cost-effective system whereby a computer user can conduct transactions of relatively small values over a computer network by the use of funds located in the local computer, without worrying whether a debit card account has sufficient funds, and without significant delays caused by interruptions for verification, authorization, and/or obtaining additional funds in the account.

SUMMARY OF THE INVENTION

The present invention overcomes the prior art limitations by including a mechanism for directing the transfer of funds into an electronic purse built into a local computer to be used for purchases on a network. The mechanism also provides for reloading the purse when necessary to complete a transaction. Thus, with the invention, the user is permitted to conduct a transaction on a computer network, e.g., the Internet, and to increase the funds in the electronic purse (or the balance of an account on the local computer) to cover the transaction price if the price exceeds the balance. Advantageously, the user, while conducting the on-line transactions, is not required to get off-line to increase the funds in his/her account. In accordance with an additional aspect of the invention, the user's computer stores the transaction information in its memory for recordation purposes.

The inventive system preferably includes (1) a user's computer with associated software, (2) a merchant computer which conducts transactions with the user's computer, and (3) a computer maintained by a financial service provider (FSP) which can read, compare, and write back data to the user's computer.

The FSP defines the present cashless transaction service features and requirements, and overlooks the service. In accordance with the invention, a user acquires cashless transaction software provided by the FSP which may also be distributed as part of a network operating system package. Each individual software package will have a unique account number associated with it. Having loaded the software on his/her PC, the user is prompted through an initialization and load process wherein the user provides the FSP with personal information and identifies issuer banks with which the user would like to be registered. The FSP then may make an amount of funds, e.g. $25, available to the user computer, in a secure fashion, for use in future computer network transactions. The FSP, at some later time, settles with the user's issuer bank which bills the user for the amount of the load.

The user may, thereafter, use his computer to complete a cashless network transaction of a relatively small amount. For example, to purchase several pages of an article from a document service on the Internet, the user may go onto the network, e.g., the Web, and make a purchase of the pages for $3. The merchant computer will register the sale and the amount of the transaction will be deducted from the balance on the user's computer. This transaction will be stored in the user computer's memory. If the balance on the computer is less than the transaction amount, the user may be given the option to reload the account which increases the account balance on his/her computer. The reload may be programmed to be selected by the user or automatic. For example, if the user has only a $1.00 balance in his/her electronic purse and the transaction amount is $1.50, after the reload is performed, the user's purse may be increased by an amount, e.g., $25.00. The new user balance will be $24.50, taking into account the amount previously remaining in the account and the transaction amount. Preferably, each reload amount is limited by a maximum and minimum amount value.

Upon reload, the issuer bank is informed by the FSP of the reload and bills the user for the increase. Preferably, the issuer bank simultaneously transfers electronically the amount to the FSP which places the increased amount into a separate account out of which the amount of the transaction is withdrawn. That separate account referred to as a "pooled account" or a "float" holds all outstanding prepaid revenues for all users of the issuer bank. The FSP maintains a database of all such pooled accounts and their outstanding balances. If no transaction has been made for a specified period of time, the FSP may direct the issuer bank to reimburse a particular user for his or her unspent balance. In addition, the user may request, at any time, a credit of the unspent balance.

In accordance with an aspect of the invention, at the end of each day, a merchant downloads data on each transaction of the day onto a tape and transmits the tape to the FSP electronically or off-line. The tape contains merchant identification and transaction information. Alternatively, the data on the tape may be transmitted electronically to the FSP computer through a communication link, without using the tape itself. After updating the database by deducting the transaction amounts from the pooled accounts, the FSP electronically transfers the total transaction amount, possibly less a transaction fee, to an acquirer bank with which the merchant has an account. The acquirer bank then distributes the funds, possibly less another transaction fee, to the merchant's account.

BRIEF DESCRIPTION OF THE DRAWINGS

Further objects, features and advantages of the invention will become apparent from the following detailed description taken in conjunction with the accompanying figures showing a preferred embodiment of the invention, in which.

Throughout the figures, the same reference numerals and characters, unless otherwise stated, are used to denote like features, elements, components or portions of the illustrated embodiment. Moreover, while the subject invention will now be described in detail with reference to the figures, it is done so in connection with a preferred embodiment. It is intended that changes and modifications can be made to the described embodiment without departing from the true scope and spirit of the subject invention as defined by the appended claims.

DETAILED DESCRIPTION

Figure 1:
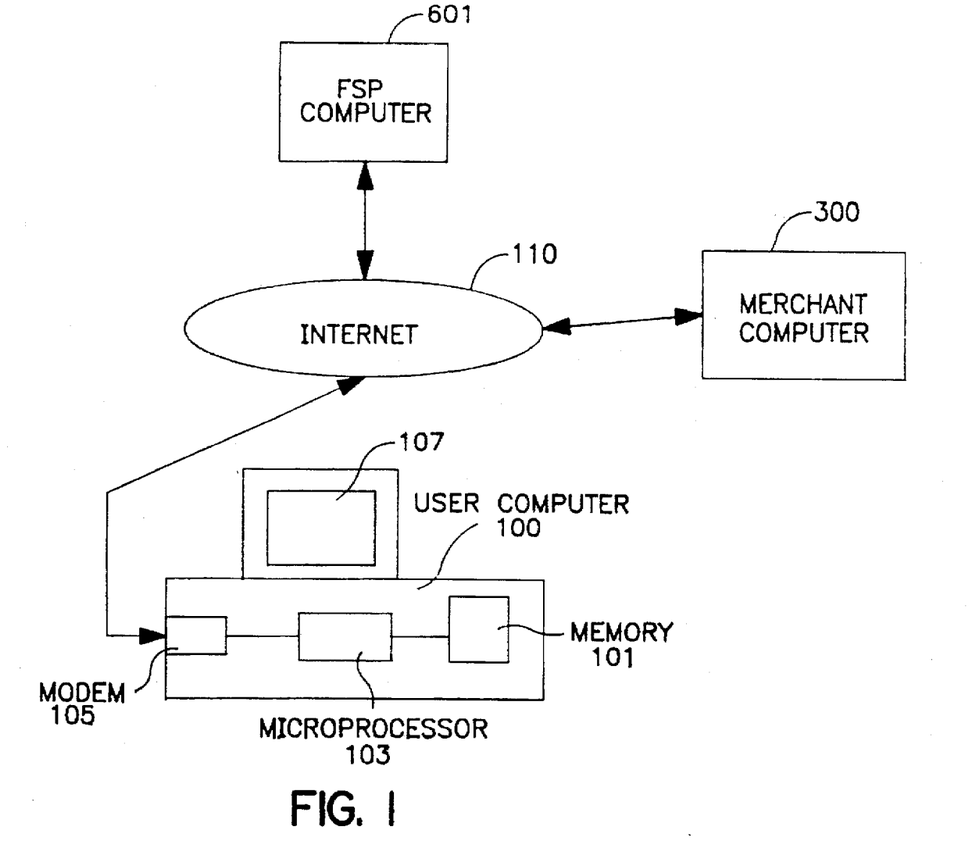
FIG. 1 illustrates a cashless transaction system comprising a computer network connecting a user computer, an FSP computer and a merchant computer in accordance with the invention.

The present invention is directed to a technique for conducting cashless transactions on a computer network, e.g., the Internet. In FIG. 1, computer 100, a conventional personal computer, is employed by a user to access Internet network 110 via a dial-up link to conduct the cashless transaction in accordance with the invention. Since Internet network 110 is a packet-switched network wherein messages may be routed through many different nodes before reaching their destinations, a substantial risk of having the messages intercepted on the Internet arises. To eliminate such risk, a well-known encryption technique such as private key cryptology, e.g., the Data Encryption Standard (DES), or public key cryptology, e.g., the RSA algorithm, is used to provide secure encryption and decryption for data transmission over network 110. Named after its developers, Rivest, Shamir, and Adelman, the RSA algorithm uses a private key and a public key to encrypt and decrypt messages. The keys are generated mathematically in part by combining prime numbers. For details on the RSA algorithm and its application, one may refer to U.S. Pat. No. 4,405,829 issued Sep. 20, 1983 to Rivest et al., which is hereby incorporated by reference.

Computer 100 contains, inter alia, memory 101 for storing data to be described, microprocessor 103, modem 105 for establishing the dial-up link to network 110, and display 107. Also connected to network 110 are FSP computer 601 and merchant computer 300. Computer 100 is loaded with FSP cashless transaction software, to be described, preferably for conducting small purchases in lieu of cash on network 110. Computer 100 carries an account balance, or electronic purse, from which the price of the purchase or transaction is deducted. It incorporates a reload feature which permits the user to increase the account balance when the purchase price exceeds the running balance. The reload may be in a predetermined amount or limited by a maximum amount. Preferably, the maximum or predetermined amount should be of a relatively small monetary value, e.g. $25, so as not to create significant liabilities arising from possible fraudulent uses by so-called "computer hackers." By allowing a small number of reloads of a relatively small amount for a limited time period, one can effectively control and contain such liabilities. Furthermore, a minimum amount for each reload is preferable so that the transaction is cost-effective to the FSP.

Each copy of the FSP cashless transaction software has a unique account number associated with it. Once the software is installed on computer 100, the software prompts the user through an initialization process in which the user enters personal information such as the name, address, telephone, social security number, etc. and designates an issuer bank which bills the user for the initial loading and subsequent increases to the user account. All such information is forwarded to the FSP over network 110 in a secure encrypted format as described above. After a predetermined period sufficient to check the user's information, the user may request a load on his/her account from the FSP. To this end, the user again communicates with the FSP computer over network 110. If the user has been approved, this load request is granted and the user account will be loaded with an initial amount, e.g., $25. The request grant is then communicated to the issuer bank which bills the user for the initial load. The FSP then requests the same amount from the user's issuer bank or accounts for the amount, preferably placing the funds in a pooled account with all outstanding prepayments from all users. Thus, if the FSP funds 200 accounts with $25 each, the pooled account will equal $5,000.

Figure 2:
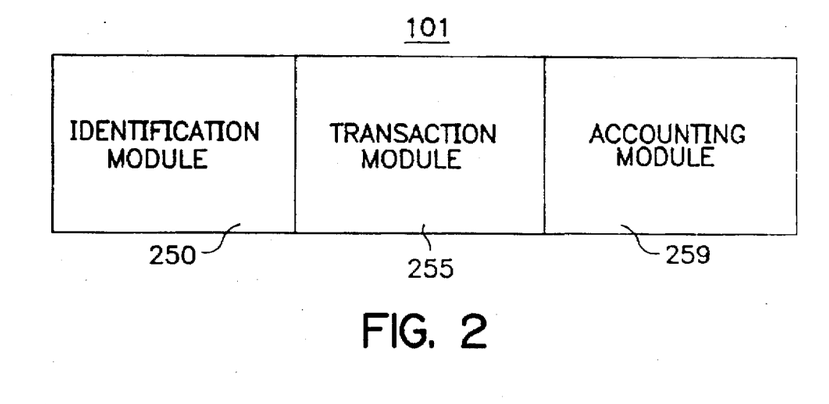
FIG. 2 is a memory map of memory space provided in the user computer of FIG. 1.

FIG. 2 depicts a memory map of data storage in memory 101. The memory map identifies various memory modules including identification module 250 containing data on an account number, an expiration date, a personal identification number (PIN) and a maximum number of PIN entry attempts; transaction module 255 containing purchase data such as last date and time of purchase, duration since last purchase, amount of purchase and a "credit back" period; and accounting module 259 containing the balance data, the outstanding number of reloads, and a predetermined "maximum number of reloads." All this data is used to identify the account, operate the system, and track the purchase after a transaction is completed.

Specifically, the account number identifies the account associated with computer 100 for billing purposes. The expiration date is used to make sure the account is unexpired. The PIN is used to verify the account ownership in a conventional manner. The maximum number of PIN entry attempts is the number of incorrect tries allowed to verify the user before further use is disallowed. The date and time of purchase keeps track of the date and time of the last transaction. The duration value indicates the duration of non-use of the account, which is tracked using an internal timer (not shown) of computer 100. As described below, a "credit back" period is selected by the user from a set of predetermined time periods, e.g., 0, 30, 60, 90 days or until the account expires. If computer 100 is not used during the credit back period, the account balance is automatically refunded to the user. In the present embodiment, the "credit back" or "non-use" time period selected is 90 days. The period may be preselected or altered by the user at computer 100.

The "number of reloads" portion of accounting module 259 in memory 101 corresponds to the number of reloads remaining. The "maximum number of reloads" is the maximum number of reloads allocated to the user. Preferably, if the maximum number is zero, the user will not be able to use the reload feature. Setting the maximum number allows the FSP and issuer bank to control the spending limit of each account.

Figure 3:
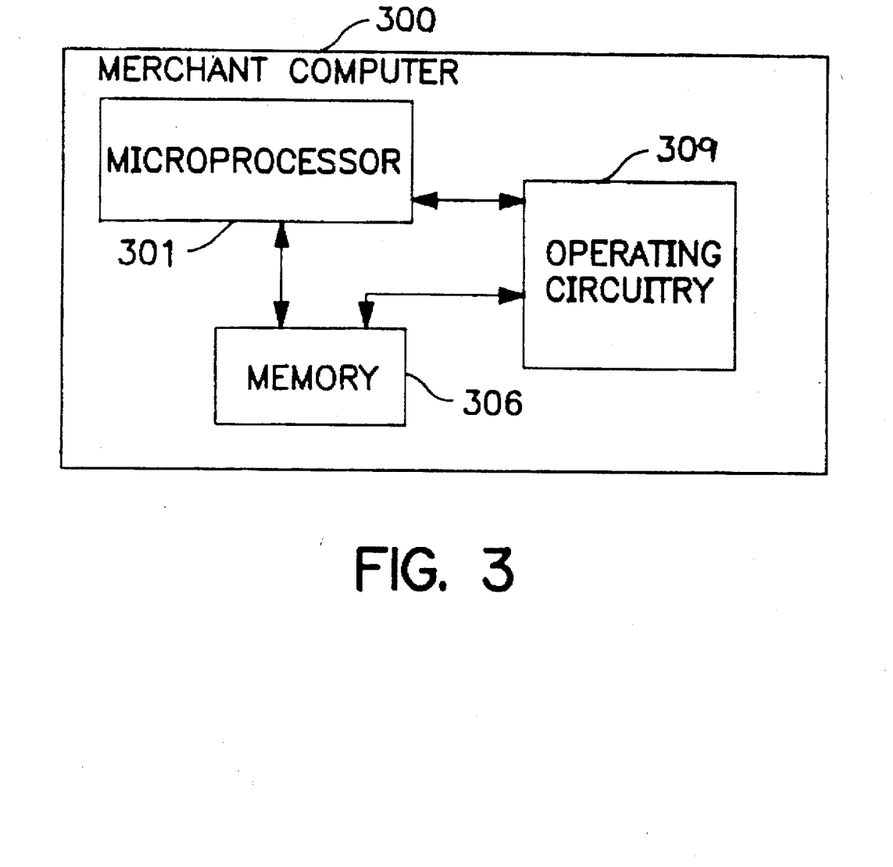
FIG. 3 is a schematic diagram of the merchant computer of FIG. 1.

FIG. 3 is a block diagram of merchant computer 300. Merchant computer 300 contains, inter alia, microprocessor 301, memory 306 and operating circuitry 309. The latter includes capabilities of transmitting and receiving data to and from network 110 pursuant to the standard Internet protocols and in a secure encrypted format as described above.

Figure 4:
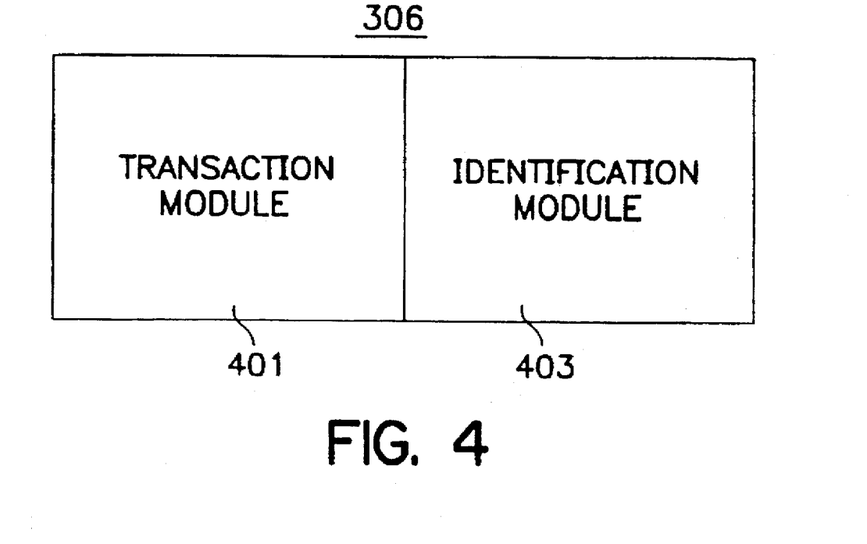
FIG. 4 is a memory map of memory space provided in the merchant computer of FIG. 3.

FIG. 4 depicts a memory map of data storage in memory 306 of merchant computer 300 which is of a conventional design. The memory map identifies two modules. Transaction module 401 records purchases made with computer 100 and other user computers subscribing to the present service. Information in transaction module 401 preferably contains a record for each purchase including an account number, amount of purchase, date of purchase, and account balance. Identification module 403 includes information about the merchant's name and account number associated with an acquirer bank with which the merchant has an account.

Figure 5A:
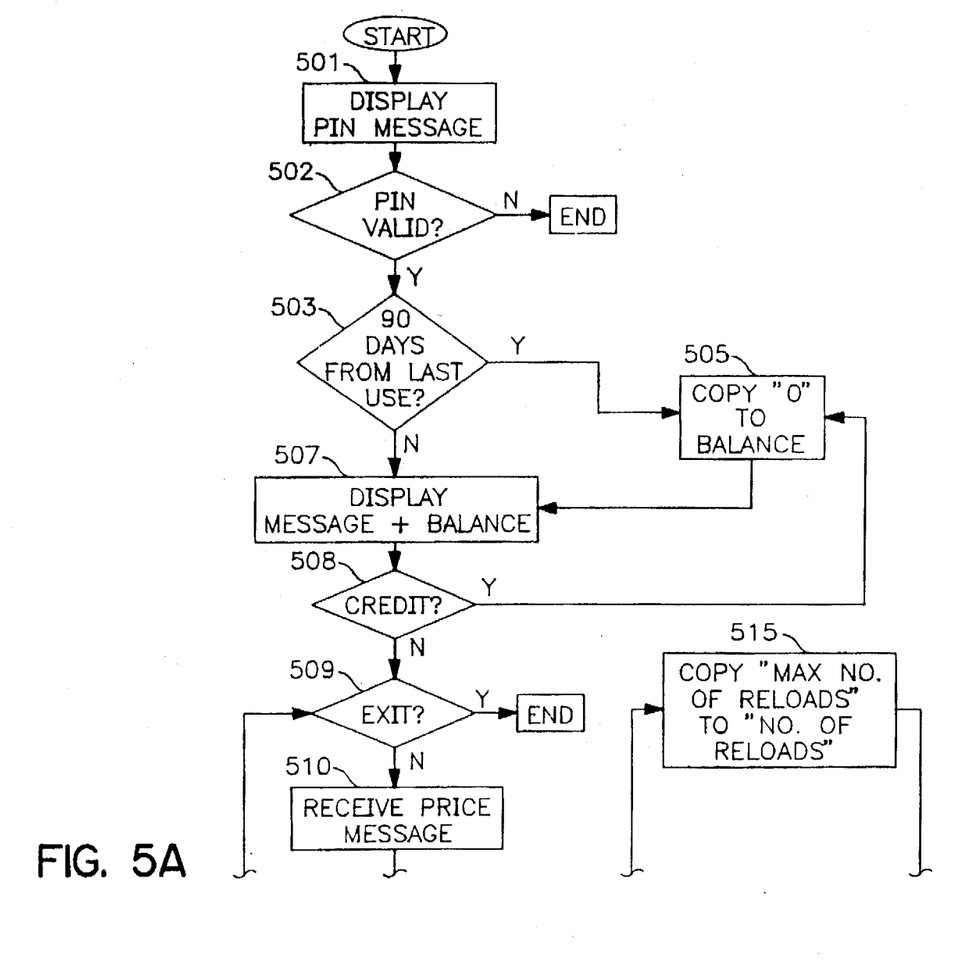
FIG. 5 is a flow chart illustrating a process for conducting a cashless transaction in accordance with one embodiment of the invention.
Figure 5B:
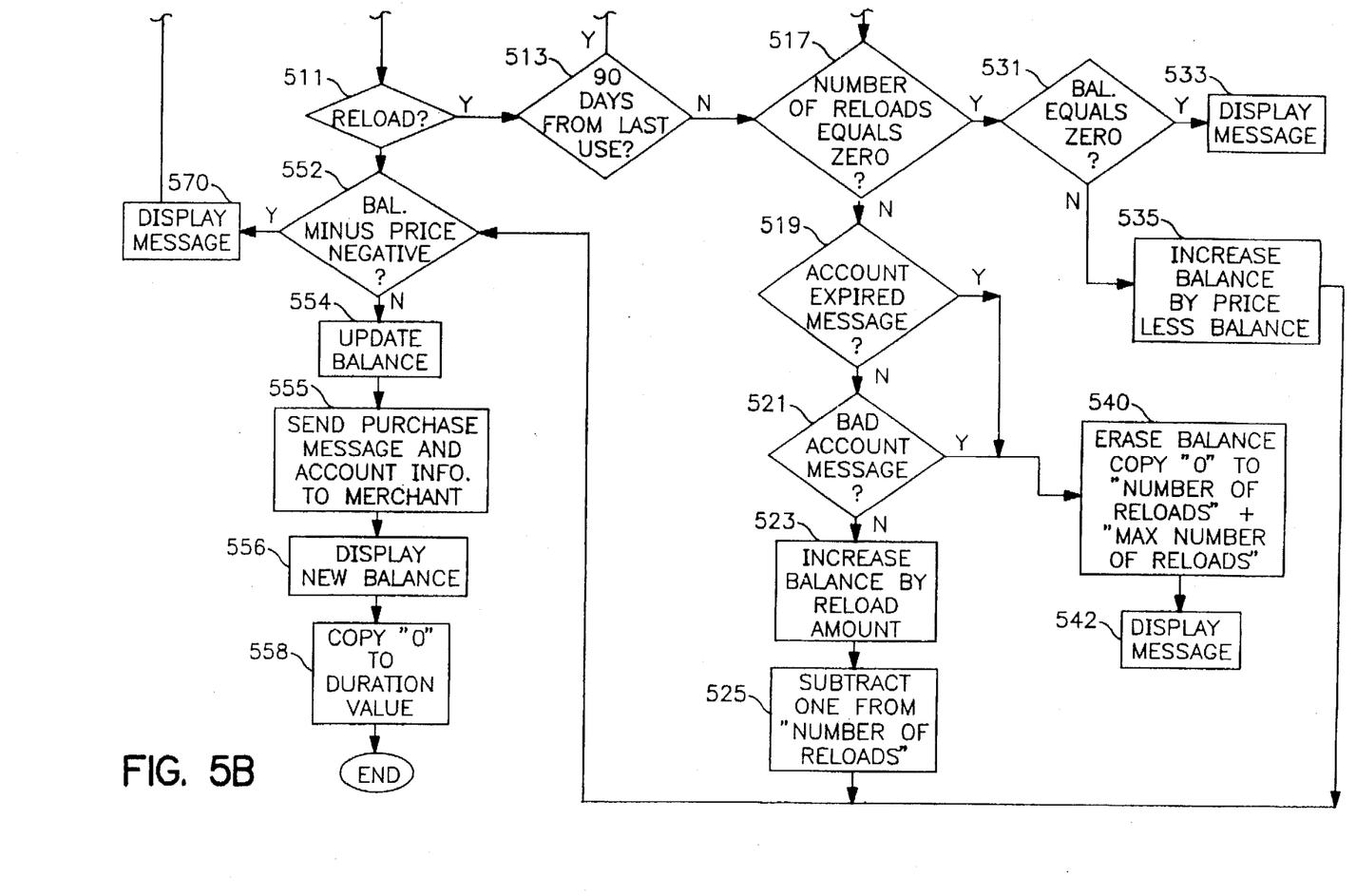

FIG. 5 is a flow chart illustrating a process within the FSP cashless transaction software to conduct the cashless transactions with the reload feature in accordance with the invention. Using computer 100, the user accesses network 110 and may browse through hypertext documents provided by merchant computer 300 connected to network 110. These hypertext documents, starting at the home page, describe the products and services offered by the merchant as well as their associated prices. These hypertext documents may contain multimedia information such as images of products. If the user finds a product that he wishes to purchase at the price shown, he may hit a particular key on a keyboard (not shown) of computer 100 or choose a particular hypertext graphic with mouse or a pointing device (not shown) of computer 100 that begins the purchase process. In this example, the user selects a $1 journal page from an article for the purchase.

The process starts in step 501 where a message is displayed on display 107 of computer 100 requesting the user to enter his PIN to identify himself/herself as the owner of the cashless transaction software. When a PIN is entered on the computer 100 keyboard, the number is checked against the PIN stored in memory 201 of computer 100. If the numerical sequences are different, computer 100 asks for the PIN again in case it was mistyped or partially forgotten. The user is allowed to have a maximum number of attempts which is stored on computer 100, in this case three attempts, in order to enter the correct PIN before the purchase request is rejected.

If, in step 502, the PIN number stored in memory 101 matches any one of the up to three numbers entered, the transaction continues to step 503. Otherwise, the process ends.

In step 503, microprocessor in computer 100 compares the duration value in memory 101 with the credit-back period, 90 days, in memory 101. In accordance with an aspect of the invention, FSP computer 601 reimburses the user for the unused account balance on computer 100 if computer 100 is not used in a 90 day period. The account balance on computer 100 is therefore assumed to have been credited back to the user after the 90 day period in accordance with the invention. With this assumption, the account balance portion of accounting module 259 of memory 101 in computer 100 is reset to a zero value in step 505. After this step, or if 90 days have not passed since the last transaction, the account balance stored in computer 100 is displayed on display 107, as indicated in step 507. Also displayed is a message asking the user to specify whether he/she wants to make the purchase, reload the account balance, obtain a credit of the existing account balance, or exit the process. The user then depresses a key on the keyboard or clicks with a mouse on the icon associated with these choices, sending a message to microprocessor 103.

In step 508, if computer 100 detects that the user chose the credit option, the FSP computer initiates a credit as explained below and the process continues in step 505. If not, the process continues in step 509.

In step 509, if computer 100 detects that the user chose the exit option, the process ends. Otherwise, the process continues in step 510 wherein a message is received from merchant computer 300 indicating the price of the product or service chosen by the user. If, in step 511, computer 100 detects that the user, having recognized that the account balance is less than the price of the product, chose the reload option, specifying a desired reload amount, the process continues in step 513.

Alternatively, the system could have an automatic reload feature. For example, the balance could be automatically increased by a predetermined sum each time the user's account balance is less than that value needed to make a purchase. To this end, when the user enters the purchase process, he/she is not presented with an option to reload. Rather, computer 100 automatically attempts to reload by a predetermined sum when the purchase price received from merchant computer 300 exceeds the account balance.

In step 513, microprocessor 101 in computer 100 again compares the duration value in memory 101 with the credit-back period in memory 101. If the duration value exceeds the credit-back period, the process continues in step 515. If not, the process continues in step 517. In step 515, the "maximum number of reloads" value stored in memory 101 is preferably copied into the "number of reloads" portion of accounting module 259 of computer 100 to allow the user more reloads.

Next, in step 517, the value stored in the number of reloads portion of accounting module 259 in memory 101 of computer 100 is compared to a value of zero. If the value does not equal zero, i.e., computer 100 has some remaining reloads, computer 100 is automatically routed to FSP computer 601 and the data stored in memory 101 of computer 100 is sent over network 110 to FSP computer 601.

FSP computer 601 determines whether the user account has expired by comparing the expiration date stored in memory 101 of computer 100 with the present date generated by a timer in FSP computer 601. In step 519, if computer 100 receives a message from FSP computer 601 indicating that the account has expired, the account balance, number of reloads and maximum number of reloads of computer 100 are overwritten in step 540 to become zero and the reload request is rejected. If the message indicates that the account has not expired, the process goes to step 521.

FSP computer 601 also reads the account number from memory 101 of computer 100 and compares it against a list of bad accounts stored in the memory of FSP computer 601. In step 521, if computer 100 receives a message that the account number matches a number on the bad account list, the card is presumed invalid and the reload request is denied. Again, the account balance of computer 100 is overwritten in step 540 to become zero and the number of reloads and maximum number of reloads are overwritten to become zero. Also, a value is written in the credit back portion of transaction module 255 of memory 101 which represents that no more reloads will be allowed for the life of the account. The above action renders the account useless with respect to the cashless system. In the case of the overdue payment, computer 100 can be reactivated when the user pays the arrears. In step 542, suitable information is displayed on display 107, such as "bad account, account deactivated". If the message indicates that the number does not match a number on the bad account list, the process goes to step 523.

In step 523, the account balance is incremented by the reload amount (in this example $25) by computer 100 to allow sufficient funds for the purchase to be made. The "number of reloads" value in memory 101 of computer 100 is reduced by one in step 525 after a reload has been triggered. Record of the reload is stored in FSP computer 601 for later processing. The process continues in step 552 as explained below.

If, in step 517, the number of reloads does equal zero, then the account balance is compared to zero in step 531. If the balance is zero, then the transaction is not allowed to proceed and a message such as "No more reloads permitted—Contact FSP" is displayed at computer 100 in step 533.

In accordance with another aspect of the invention, if the number of reloads equals zero but there is a balance of more than zero in the account, then the transaction is the final one allowed, and the balance is only increased to cover the amount of the purchase. This allows the transaction to be completed and reduces the balance to zero in computer 100. In step 535, the difference between the price and remaining balance is added to the balance to ensure enough funds to purchase the item. The process then skips to 552 described below.

If computer 100 detects, in step 511, that the user chose the purchase option, computer 100, in step 552, analyzes whether the purchase price subtracted from the balance stored in memory 101 results in a negative number. If, in step 552, the resulting balance is a negative number (indicating that the price of the item is greater than the account balance stored in computer 100), a message is displayed, in step 570, informing the user that his account balance is insufficient to purchase the product and that he must request a reload to continue. The process continues in step 509 as described above. Alternatively, a reload is automatically processed when the purchase price exceeds the account balance, as indicated above, and the purchase process is continued as described below.

If, in step 552, computer 100 determines that the price of the item selected is less than or equal to that of the account balance stored in memory 101, the balance is decreased on computer 100 by the transaction price in step 554. In step 555, information stored in memory 101 of computer 100 (including account number and account balance) is sent in a secure encrypted form to memory 306 of merchant computer 300 along with a message indicating the purchase. Further, the incremented value stored in computer 100 is decreased by the price of the item and this new value is written back onto computer 100 in the balance portion of accounting module 259 of memory 101. Finally, a record of the transaction is also stored in the transaction module 255 of memory 101.

In step 556, computer 100 displays the new balance. In step 558, the duration value portion of transaction module 255 of memory 101 in computer 100 is overwritten to zero.

Figure 6:
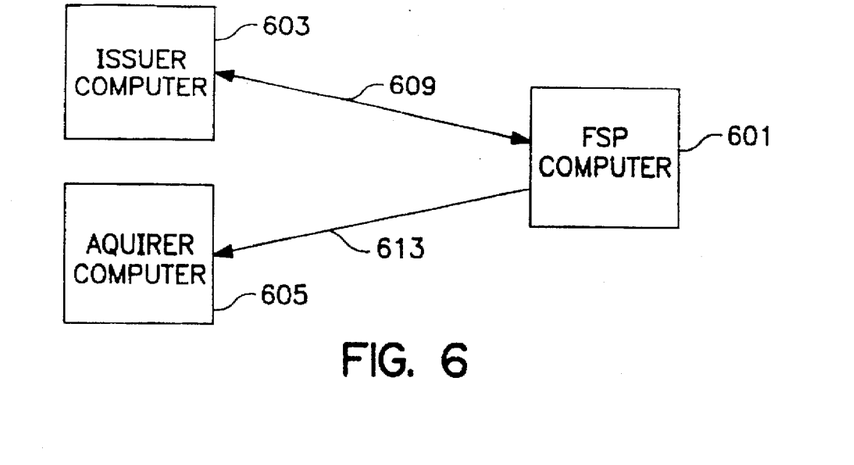
FIG. 6 illustrates the connections between the FSP computer and an issuer computer together with an acquirer computer in accordance with the invention.

FIG. 6 illustrates connections between FSP computer 601 and issuer computer 603 and acquirer computer 605. At the close of each day, merchant computer 300 downloads transaction and identification information stored in modules 401 and 403 of memory 306 (including the account number, amount of the transaction, the last account balance, and merchant name and account number) to a tape. The merchant physically forwards the tape to the FSP for loading the information recorded on the tape onto FSP computer 601. Such information allows FSP computer 601 to identify the user accounts, merchant and transaction amounts.

Alternatively, the transaction information may be sent electronically over a communication link in a secure encrypted form as described above. FSP computer 601 processes the information, updates the various floats and transmits the total of the transactions by merchant (possibly less transaction fees) to acquirer computer 605 via communication link 613 in a secure encrypted form as described above. The acquirer bank then credits the merchant account based on the amounts transacted.

Figure 7A:
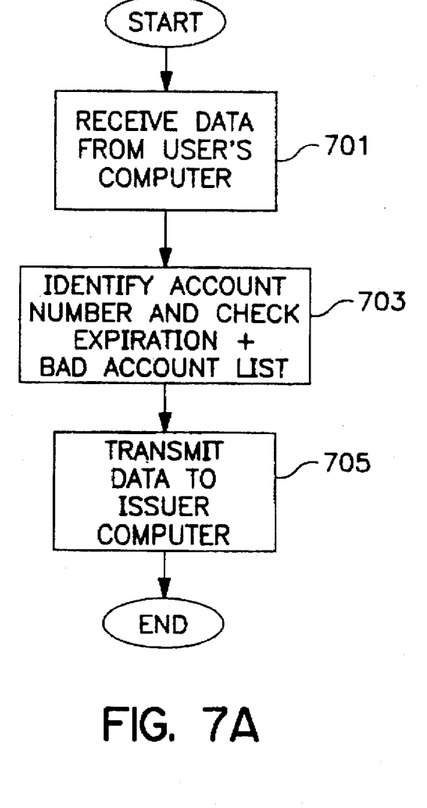
FIG. 7A is a flow chart illustrating a process in the FSP computer of FIGS. 1 and 6.

FIG. 7A shows the process employed in FSP computer 601 upon a reload. In step 701, FSP computer 601 receives data from computer 100 regarding the reload via network 110. In step 703, FSP computer 601 identifies from the transmitted data the account number of computer 100 and checks the account expiration and bad account list. Assuming the account is valid, FSP computer 601 then transmits reload data information in step 705 to issuer computer 603 via communication link 309 in a secure encrypted form as described above.

Figure 7B:
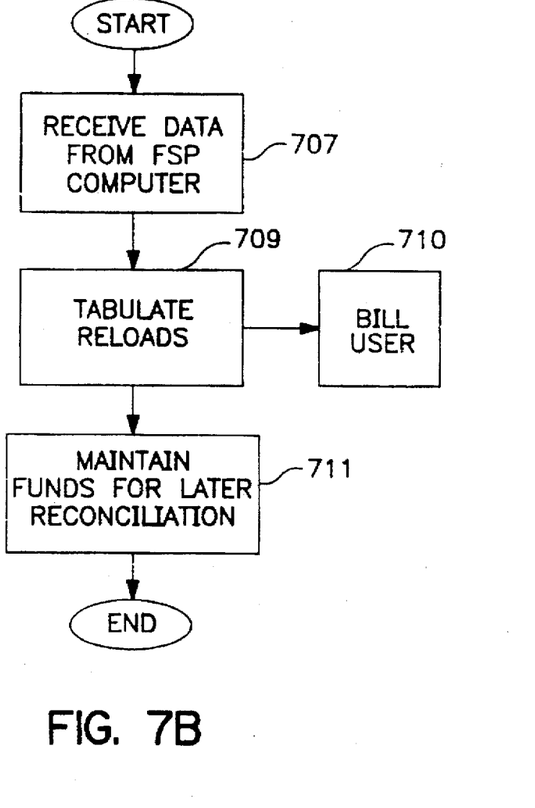
FIG. 7B is a flow chart illustrating a process in the issuer computer of FIG. 6.

FIG. 7B describes a process employed in issuer computer 603. In step 707, issuer computer 603 receives the data regarding the reload from FSP computer 601. In step 709, issuer computer 603 stores the reload data pertaining to the corresponding account number. Issuer computer 603 then bills the user for each reload of $25 incurred during a billing period in step 710. In step 711, issuer computer 603 responsively funds the associated float or pooled account kept in FSP computer 601 for each reload.

Figure 7C:
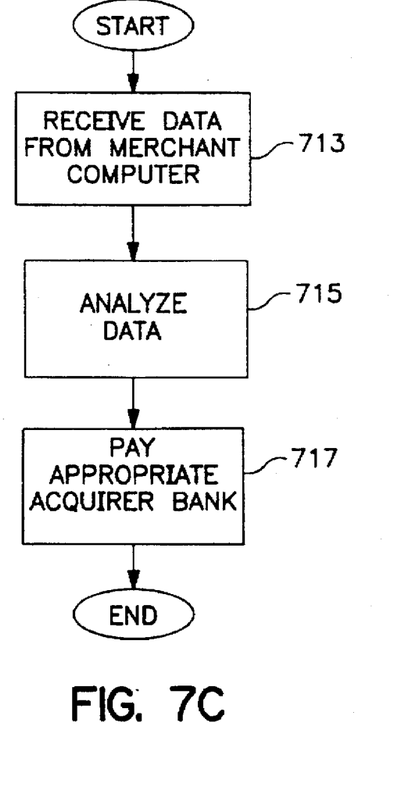
FIG. 7C is a flow chart illustrating a second process in the FSP computer of FIGS. 1 and 6.

FIG. 7C describes another process in FSP computer 601. In step 713, FSP computer 601 receives the transaction data preferably on tape from merchant computer 300. In step 715, FSP computer 601 analyzes the data, updates the various float accounts and stores the data in a central database. Finally, in step 717, FSP computer 601 forwards the funds, corresponding to that of the transaction amount (possibly less a transaction fee) to acquirer computer 605. The acquirer bank then credits the merchant account the total transaction amount recorded at merchant computer 300 possibly less a financial services provider fee.

Figure 8:
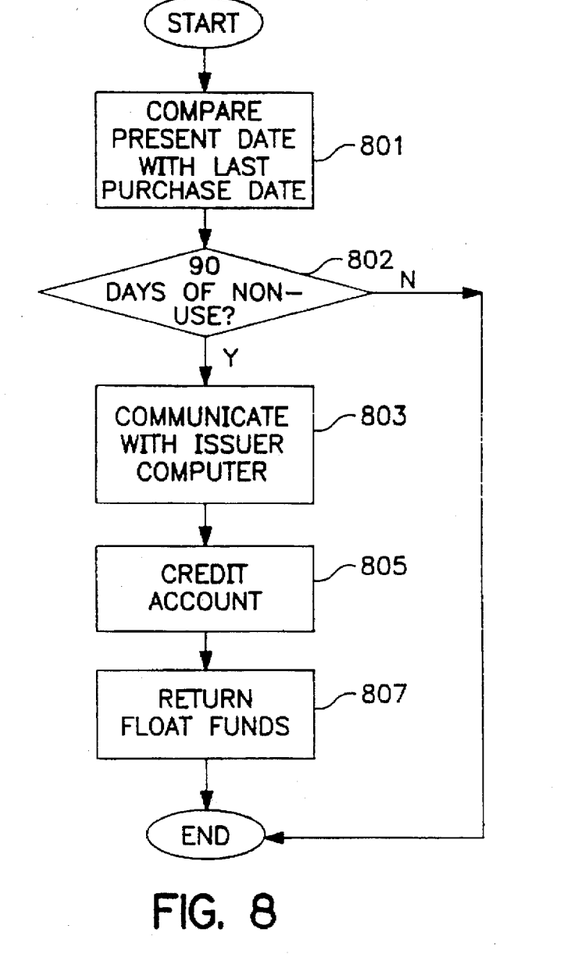
FIG. 8 is a flow chart illustrating a process for refunding a user for unused funds in an account in accordance with an aspect of the invention.

FIG. 8 describes the credit-back process implemented in FSP computer 601 after a certain period (preferably 90 days) of no activity on the account kept in computer 100. This credit-back process ensures the user does not lose the unspent money on the account. In step 801, FSP computer 601 compares the present date with the date of the last purchase associated with computer 100 stored in its database and determines if the account has not been active for longer than 90 days. If, in step 802, it is determined that the inactivity is not longer than 90 days, FSP computer 601 takes no action. Otherwise, FSP computer 601, in step 803, sends a message to issuer computer 603 via communication link 309 indicating that the account should be credited with its outstanding balance. Also, when a user requests a credit from FSP computer 601, the process is begun in step 803. In step 805, issuer computer 603 credits the user's account with the outstanding balance accordingly. In step 807, FSP computer 601 withdraws the credit-back amount from the float associated with the issuer bank to compensate for the credit.

Figure 9:
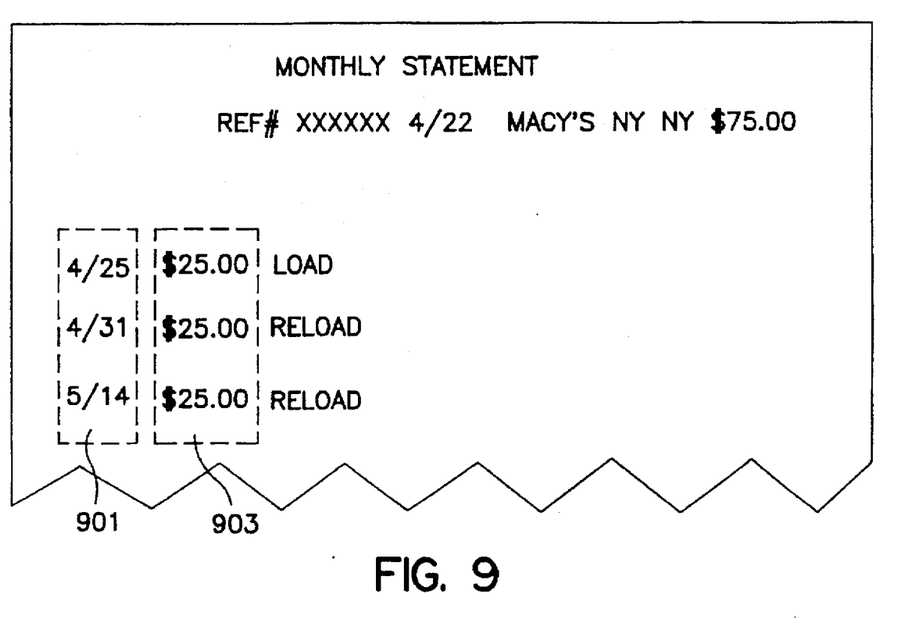
FIG. 9 illustrates a monthly bill reflecting fund increases to the user account by the system of FIG. 1.

FIG. 9 illustrates a statement documenting an initial load and subsequent reloads made by the user of computer 100. The statement is sent from issuer computer 603 to the user to provide a record of increases during the billing period and to bill the user for the same. This preferred embodiment details date of load 901 and load amount 903. The statement may be part of the user's regular credit card bill or may be sent only if requested by the user. Further, computer 100 provides a function for displaying and printing out a description of the purchases. Upon request by the user, the data in module 255 of memory 101 is written to display 107 or a printer (not shown). This information mirrors the information used by FSP computer 601 to adjust the float accounts as transactions are processed.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, memory 101 could also contain data needed to conduct conventional credit card transactions. In addition, computer 100 could have additional memory modules containing balances for different foreign currencies. This would allow world-wide utilization of the system by keeping separate balances each of which could be reloaded. The reload value of the foreign currency would likewise be small and preferably in an amount equivalent to U.S. $25. The memory modules could contain associated "credit back" memory locations to allow different time periods for credit-backs for each foreign currency. The memory modules could also contain individual "maximum number of reloads" and "number of reloads remaining" portions of accounting modules associated with each currency.

In addition, it may be desirable to remove the above described feature of forcing the last transaction to completion. That is, the system prevents the transaction whenever the number of reloads is zero and the balance is less than the price of the desired items regardless of whether the balance is non-zero. This would remove the feature of covering the last transaction described above but would make the system easier to implement.

Finally, the present invention has been described and disclosed in a form in which the various system functions are performed by discrete functional blocks. However, any one or more of these functions could equally well be performed by one or more appropriately programmed microprocessors, micro-coded chips, etc.

I claim:

1. A system for conducting cashless transactions on a network which transmits data, comprising:

a plurality of consumer terminals coupled to said network, each of said plurality of consumer terminals comprising an input means for selecting one of said cashless transactions, a processor and a memory including a first storage area for storing data representative of an available fund;

a merchant computer coupled to said network for providing data representing at least one of said cashless transactions, including a transaction amount to at least one of said plurality of consumer terminals over said network, and a financial services provider computer coupled to said network for receiving increase requests from and providing data representative of said available fund to said plurality of consumer terminals;

wherein said processor of said at least one of said plurality of consumer terminals is responsive to said transaction amount and said available fund such that if the difference between said available fund and said transaction amount is below a predetermined threshold, it provides to said financial services provider computer request data to increase said available fund a predetermined amount and upon said increase executes said selected cashless transaction by decreasing from said available fund said transaction amount to complete said cashless transaction.

2. The system of claim 1 wherein said transaction information comprises purchase data representing at least one purchase item to select and a transaction amount required to purchase said at least one purchase item, and wherein said selected cashless transaction is executed by decreasing said available fund by said transaction amount of said selected cashless transaction.

3. The system of claim 1 wherein said merchant terminal records purchase information of said selected cashless transaction and said available fund after said purchase is executed.

4. The system of claim 1 wherein said processor of said one of said plurality of consumer terminal apparatus provides said request data to increase said available fund responsive to said input means.

5. The system of claim 1 wherein said processor of said one of said plurality of consumer terminal apparatus automatically provides said request data to increase said available fund when said transaction amount is greater than said available fund.

6. The system of claim 1 wherein said first storage area further stores data representative of available fund increase information and wherein said processor of said one of said plurality of consumer terminal apparatus provides said request data to increase said available fund, responsive to said input means and said available fund increase information.

7. The system of claim 1 wherein said first storage area further stores data representative of available fund increase information and wherein said processor of said one of said plurality of consumer terminal apparatus automatically provides said request data to increase said available fund, responsive to said available fund increase information, when said transaction cost data is greater than said available fund.

8. The system of claim 6 wherein said available fund increase information comprises:

a current number of available fund increases; and a maximum number of available fund increases.

9. The system of claim 8 wherein said request data is not provided to said financial services provider computer if said current number equals said maximum number.

10. The system of claim 7 wherein said available fund increase information comprises:

a current number of available fund increases; and a maximum number of available fund increases.

11. The system of claim 10 wherein said request data is not provided to said financial services provider computer if said current number equals said maximum number.

12. The system of claim 1 wherein said network is an Internet network.

13. The system of claim 1 wherein said selected cashless transaction comprises a purchase of a selected item, said one of said plurality of consumer terminal apparatus further comprising means for browsing information about said selected item.

14. The system of claim 13 wherein said information is multimedia information including an image of said selected item.

15. The system of claim 1 wherein said memory of said one of said plurality of consumer terminal apparatus further includes a second storage area for storing data representative of a selected period of inactivity and data representative of a duration since last transaction, wherein said processor of said one of a plurality of consumer terminal apparatus compares said selected period of inactivity with said duration and sets said available fund to zero if said duration exceeds said selected period of inactivity.

16. The system of claim 1 wherein said processor of said one of said plurality of consumer terminal apparatus increases said available fund by a reload sum.

17. The system of claim 16 wherein said reload sum is predetermined.

18. The system of claim 1 wherein said financial services provider computer receives over said network said request data for an increase in said available fund located in said memory, determines whether said request should be granted and transmits granted request data, if granted, to said one of said plurality of consumer terminal apparatus.

19. The system of claim 1 wherein said request data includes account identification information of said account and wherein said financial services provider computer comprises:
   a memory for storing a list of selected account identifications; and
   a processor for comparing said account identification information with said list and determining whether said account identification is within said list, said financial services provider computer transmitting a rejected request signal to said one of said plurality of consumer terminal apparatus responsive to said request disallowing completion of any cashless transaction when said account identification is determined to be within said list.

20. The system of claim 1 wherein said request data includes expiration date information associated with said account and wherein said financial service provider computer comprises:
   timer for providing a present date; and
   a processor for comparing said present date with said expiration date, said financial services provider computer transmitting a rejected request signal to said one of said plurality of consumer terminal apparatus responsive to said request disallowing completion of any cashless transaction when said account is determined to be expired.

21. The system of claim 1 wherein said financial services provider computer maintains a pooled account which is reduced responsive to said transaction information of said selected cashless transaction forwarded to said financial services provider computer by said merchant computer after said selected cashless transaction is executed.

22. The system of claim 21 further comprising an issuer bank computer coupled to said network, wherein said financial services provider computer transmits reload data over said network to said issuer bank computer, and wherein said issuer bank computer registers a number of granted requests and said reload sum for a consumer, and bills said consumer account for an amount which is a function of said number of granted requests and said reload sum and, upon billing, funds said pooled account maintained by and within said financial services provider computer by said reload sum.

23. The system of claim 22 further comprising an acquirer bank computer coupled to said network, wherein said financial services provider computer transmits a transaction total for each merchant computer to said acquirer bank computer, and wherein said acquirer bank computer, responsive to receiving said transaction total, credits a merchant account corresponding to said merchant computer based on said transaction total.

24. The system of claim 23 wherein said financial services provider computer reduces said transaction total by a transaction fee before transmitting.

25. A system for extending funds to a consumer account to conduct cashless transactions on a computer network, comprising:
   a plurality of consumer terminal apparatus coupled to said computer network, each of said plurality of consumer terminal apparatus comprising a processor and a dedicated memory including an available fund stored therein;
   a financial services provider computer coupled to said computer network; and
   an issuer bank computer coupled to said computer network;
   wherein said processor of at least one of said plurality of consumer terminal apparatus generates request data for an increase in said available fund stored in said at least one consumer terminal apparatus and increases said available fund by a reload sum if granted request data is received from said financial services provider computer;
   wherein said financial services provider computer receives over said computer network said request data from said at least one consumer terminal apparatus for an increase in said available fund located in said memory of said at least one consumer terminal apparatus, determines whether to grant said received request, and if granted, transmits said granted request data to said at least one consumer terminal apparatus and transmits reload data representing said reload sum over said network to said issuer bank computer; and
   wherein said issuer bank computer receives said reload data and bills a consumer account associated with said at least one consumer terminal apparatus for said reload sum.

26. The system of claim 25 wherein said processor of said consumer terminal apparatus generates said request data for an increase in said available fund responsive to said available fund.

27. The system of claim 26 wherein said processor of said consumer terminal apparatus generates said request data for an increase in said available fund when said available fund is insufficient to complete said cashless transaction.

28. The system of claim 27 wherein said processor of said consumer terminal apparatus automatically generates said request data for an increase when said available fund is insufficient to complete said cashless transaction.

29. The system of claim 25 wherein said reload sum is predetermined.

30. The system of claim 25 wherein said issuer bank computer registers a number of granted requests and said reload sum and bills said consumer account for an amount which is a function of said number of granted requests and said reload sum.

31. The system of claim 25 wherein said computer network is an Internet network.

32. The system of claim 25 wherein said request data includes account identification information of said account and wherein said financial services provider computer comprises:
   a memory for storing a list of selected account identifications; and
   a processor for comparing said account identification with said list and determining whether said account identification is within said list, said financial services provider computer transmitting a rejected request signal to said one of said plurality of consumer terminal apparatus responsive to said request disallowing completion of any cashless transaction when said account identification is determined to be within said list.

33. The system of claim 25 wherein said request data includes expiration date information associated with said account and wherein said financial service provider computer comprises:

a timer for providing a present date; and a processor for comparing said present date with said expiration date, said financial services provider computer transmitting a rejected request signal to said one of said plurality of consumer terminal apparatus responsive to said request disallowing completion of any cashless transaction when said account is determined to be expired.

34. The system of claim 25 wherein upon billing, said issuer bank funds a pooled account located in said financial services provider computer by said reload sum.

35. The system of claim 25 wherein said memory further includes available fund increase information and wherein said request is generated responsive to said available fund increase information.

36. The system of claim 35 wherein said available fund increase information comprises:

a current number of available fund increases; and a maximum number of available fund increases.

37. The system of claim 36 wherein said request data is not generated if said current number equals said maximum number.

38. A method for conducting cashless transactions on a computer network with a consumer terminal apparatus coupled to said network, said consumer terminal apparatus comprising a memory, a communications device, a display and input means, said method comprising the steps of:

storing data representative of at least an available fund in said memory of said consumer terminal apparatus;

accessing said computer network with said communications device;

receiving transaction information data from a merchant computer coupled to said network;

transmitting selecting data with said communications device to said merchant computer over said computer network responsive to said input means and said transaction information;

increasing said available fund located in said memory of said consumer terminal apparatus if the difference between said transaction cost and said available fund is below a predetermined threshold; and decreasing said available fund responsive to said transaction cost and said selecting data.

39. The method of claim 38 further comprising the step of displaying information on said display representative of said available fund and said transaction information data including a transaction cost.

40. The method of claim 38 wherein said receiving step comprises the step of receiving transaction information representing at least one cashless transaction to select and a transaction cost corresponding to each of said at least one cashless transaction;

wherein said transmitting step comprises the step of transmitting selecting data responsive to a selected cashless transaction selected from said at least one cashless transaction; and wherein said decreasing step comprises the step of decreasing said available fund by said selected transaction cost to complete said selected cashless transaction.

41. The method of claim 40 further comprising the step of providing to said financial services provider computer with said communications device, request data to increase said available fund and wherein said increasing step comprises the step of increasing said available fund responsive to granted request data received from said financial services provider computer.

42. The method of claim 41 wherein said increasing step comprises the step of providing said request data to increase said available fund responsive to said input means.

43. The method of claim 41 wherein said providing step comprises the step of automatically providing said request data to increase said available fund when said available fund is less than a selected transaction cost of said selected cashless transaction.

44. The method of claim 41 wherein said storing step comprises the step of storing data representative of said available fund and available fund increase information and wherein said providing step comprises the step of providing said request data to increase said available fund responsive to said input means and said available fund increase information.

45. The method of claim 41 wherein said storing step comprises the step of storing data representative of said available fund and available fund increase information and wherein said providing step comprises the step of automatically providing said request data to increase said available fund responsive to said available fund increase information, when said transaction cost is greater than said available fund.

46. The method of claim 44 wherein said available fund increase information comprises:

a current number of available fund increases; and a maximum number of available fund increases.

47. The method of claim 46 wherein said request data is not provided to said financial services provider computer if said current number equals said maximum number.

48. The method of claim 45 wherein said available fund increase information comprises:

a current number of available fund increases; and a maximum number of available fund increases.

49. The method of claim 48 wherein said request data is not provided to said financial services provider computer if said current number equals said maximum number.

50. The method of claim 38 wherein said computer network is an Internet network.

51. The method of claim 40 wherein said selected cashless transaction comprises a purchase of a selected item, said method further comprising the step of browsing information about said selected item.

52. The method of claim 51 wherein said information is multimedia information including an image of said selected item.

53. The method of claim 38 wherein said storing step comprises the step of storing data representative of a selected period of inactivity and data representative of a duration since last transaction, said method further comprising the steps of:

comparing said selected period of inactivity with said duration; and setting said available fund to zero if said duration exceeds said selected period of inactivity.

54. The method of claim 38 wherein said increasing step comprises the step of increasing said available fund by a reload sum.

55. The method of claim 54 wherein said reload sum is predetermined.

56. A method for extending funds from a host system to a consumer terminal apparatus comprising a memory storing an available fund separate from said host system to complete a cashless transaction over a network, comprising the steps of:

receiving at said host system over said network a request for an increase in said available fund from said consumer terminal apparatus to complete a cashless transaction;

determining at said host system whether to grant said received request for said consumer terminal apparatus; and     transmitting a reply signal from said host system to said consumer terminal apparatus indicating whether said request was granted,     wherein said available fund in said consumer terminal apparatus is increased if said request is granted and wherein said available fund is used to complete said cashless transaction.

57. The method of claim 56 wherein said request includes account identification information of a consumer account and wherein said method further comprises the steps of:

storing a list of selected account identifications; and comparing said account identification information with said list and determining whether said account identification is within said list, wherein said transmitting step comprises the step of transmitting a reply signal to said consumer terminal apparatus responsive to said request disallowing completion of any cashless transaction when said account identification is determined to be within said list.

58. The method of claim 56 wherein said request includes expiration date information associated with a consumer account and wherein said method further comprises:

providing a present date; and comparing said present date with said expiration date, wherein said transmitting step comprises the step of transmitting a rejected request signal to said consumer terminal apparatus responsive to said request disallowing completion of any cashless transaction when said consumer account is determined to be expired.

59. The method of claim 56 further comprising the steps of maintaining a pooled account which is reduced responsive to transaction information received from a merchant computer coupled to said network, after said cashless transaction is executed.

60. The method of claim 59 further comprising the steps of:

transmitting reload data over said network to an issuer bank computer coupled to said network;

registering a number of granted requests and a reload sum for a consumer;

billing said consumer account for an amount which is a function of said number of granted requests and said reload sum; and     receiving funds from said issuer bank computer into said pooled account amounting to said reload sum.

61. The method of claim 60 further comprising the steps of:

transmitting a transaction total for each merchant computer to an acquirer bank computer coupled to said network; and     responsive to receiving said transaction total, crediting a merchant account corresponding to said merchant computer based on said transaction total.

62. The system of claim 61 wherein said transmitting step comprises the step of reducing said transaction total by a transaction fee.

63. A consumer terminal apparatus for conducting cashless transactions on a computer network, comprising:

a memory comprising a first storage area for storing data representative of an available fund, data representative of a current number of available fund increases and data representative of a maximum number of available fund increases allowed;

a communications device for accessing said computer network and receiving from a merchant computer cashless transaction signals representing at least one cashless transaction to select and a cashless transaction amount required to complete said at least one cashless transaction and for transmitting selection data responsive to said input means to said merchant computer, said selection signal representing a selected cashless transaction to be conducted with said merchant computer over said computer network;

a display for displaying information representative of said at least one cashless transaction and said available fund;

an input means for selecting at least one of said at least one cashless transaction; and     a processor for increasing said available fund when said available fund is less than a selected transaction amount of said selected cashless transaction; and for decreasing said available fund by said selected transaction amount to complete said selected cashless transaction, wherein said processor updates said current number of available fund increases upon each occurrence of said available fund increase.

64. The consumer terminal apparatus of claim 63 wherein said processor provides an option to a consumer through said display to increase said available fund.

65. The consumer terminal apparatus of claim 63 wherein said processor automatically increases, responsive to a granted request signal received from a financial services computer over said network, said available fund.

66. The consumer terminal apparatus of claim 63 wherein said computer network is an Internet network.

67. The consumer terminal apparatus of claim 63 wherein said selected cashless transaction comprises a purchase of a selected item, said consumer terminal apparatus further comprising means for browsing information about said selected item.

68. The consumer terminal apparatus of claim 67 wherein said information is multimedia information including an image of said selected item.

69. The consumer terminal apparatus of claim 63 wherein said communications device is a modem.

70. The consumer terminal apparatus of claim 63 wherein said increase in said available fund is not provided if said current number of available fund increases is equal to said maximum number of available fund increases.

71. The consumer terminal apparatus of claim 63 wherein said memory further comprises a second storage area for storing data representative of a selected period of inactivity and duration since last transaction, wherein said processor compares said selected period of inactivity with said duration and sets said available fund to zero if said duration exceeds said selected period of inactivity.

\* \* \* \* \*